(12) United States Patent
Shaw

(10) Patent No.: US 9,774,982 B2
(45) Date of Patent: Sep. 26, 2017

(54) LONG TERM EVOLUTION MACHINE TO MACHINE PRIVACY PROTECTION

(71) Applicant: AT&T Intellectual Property I, LP, Atlanta, GA (US)

(72) Inventor: Venson Shaw, Kirkland, WA (US)

(73) Assignee: AT&T Intellectual Propetry I, L.P., Atlanta, GA (US)

( * ) Notice: Subject to any disclaimer, the term of this patent is extended or adjusted under 35 U.S.C. 154(b) by 0 days.

(21) Appl. No.: 14/067,480

(22) Filed: Oct. 30, 2013

(65) Prior Publication Data
US 2015/0118996 A1    Apr. 30, 2015

(51) Int. Cl.
| H04M 1/66 | (2006.01) |
| H04M 1/68 | (2006.01) |
| H04M 3/16 | (2006.01) |
| H04W 4/00 | (2009.01) |
| H04W 12/08 | (2009.01) |
| H04W 76/02 | (2009.01) |
| H04L 29/06 | (2006.01) |

(52) U.S. Cl.
CPC .......... *H04W 4/005* (2013.01); *H04W 12/08* (2013.01); *H04W 76/02* (2013.01); *H04L 63/107* (2013.01)

(58) Field of Classification Search
None
See application file for complete search history.

(56) References Cited

U.S. PATENT DOCUMENTS

| 6,343,213 | B1* | 1/2002 | Steer et al. ................... 455/411 |
| 7,035,923 | B1 | 4/2006 | Yoakum et al. |
| 7,058,414 | B1* | 6/2006 | Rofheart et al. ........... 455/456.4 |
| 7,610,343 | B2 | 10/2009 | Ikezawa et al. |
| 7,640,300 | B2 | 12/2009 | Wohlgemuth et al. |
| 7,984,102 | B1 | 7/2011 | Raphel et al. |
| 8,090,821 | B2 | 1/2012 | Holt et al. |
| 2003/0174048 | A1* | 9/2003 | McCorkle .................. 340/10.34 |
| 2004/0062262 | A1* | 4/2004 | Venteicher et al. .......... 370/431 |
| 2004/0127214 | A1* | 7/2004 | Reddy .................... H04W 4/02 455/426.2 |
| 2004/0203600 | A1* | 10/2004 | McCorkle et al. ........... 455/411 |
| 2005/0021679 | A1* | 1/2005 | Lightman et al. ............ 709/219 |
| 2005/0151642 | A1* | 7/2005 | Tupler .................... G08B 25/08 340/539.18 |

(Continued)

OTHER PUBLICATIONS

Abidar et al., "Mobile Device and Multi Agent Systems: An Implemented Platform of Real Time Data Communication and Synchronization," Multimedia Computing and Systems (ICMGS), 2011 International Conference, 2011, 1-6.

(Continued)

*Primary Examiner* — Moustapha Diaby
(74) *Attorney, Agent, or Firm* — Baker & Hostetler LLP

(57) ABSTRACT

An intelligent decision engine is configured on a mobile device that includes rules and criteria that the engine uses to determine whether to allow the mobile device to engage in M2M communications with an M2M device. The criteria may be based on user groups, location of the mobile device, privacy zones that may or may not include the M2M device, "black" and/or "white" access lists, time of day, traffic on a wireless link to a wireless network, etc. If the communication meets all applicable criteria it is permitted to commence, and if not, it is blocked.

15 Claims, 8 Drawing Sheets

(56) References Cited

U.S. PATENT DOCUMENTS

| | | | |
|---|---|---|---|
| 2005/0169219 A1* | 8/2005 | Serpa | H04L 29/12254 370/338 |
| 2007/0036279 A1* | 2/2007 | Tam | H04M 1/274558 379/45 |
| 2008/0075066 A1 | 3/2008 | Baker | |
| 2008/0182589 A1* | 7/2008 | Buccieri | H04W 4/02 455/456.3 |
| 2009/0054091 A1 | 2/2009 | van Wijk et al. | |
| 2009/0216344 A1* | 8/2009 | Bretin | 700/21 |
| 2010/0177711 A1* | 7/2010 | Gum | 370/329 |
| 2010/0211475 A1* | 8/2010 | Nojima et al. | 705/26 |
| 2010/0246501 A1* | 9/2010 | Prakash et al. | 370/329 |
| 2011/0039518 A1* | 2/2011 | Maria | 455/406 |
| 2012/0203905 A1 | 8/2012 | Lee et al. | |
| 2012/0225652 A1 | 9/2012 | Martinez et al. | |
| 2012/0237006 A1* | 9/2012 | Kim | H04M 1/274516 379/88.01 |
| 2012/0252481 A1 | 10/2012 | Anpat et al. | |
| 2012/0264443 A1 | 10/2012 | Ng et al. | |
| 2013/0021972 A1 | 1/2013 | Lim et al. | |
| 2013/0057912 A1* | 3/2013 | Park | H04L 63/102 358/1.15 |
| 2013/0124739 A1 | 5/2013 | Oda et al. | |
| 2013/0198838 A1 | 8/2013 | Schmidt et al. | |
| 2013/0217361 A1 | 8/2013 | Mohammed et al. | |
| 2014/0051379 A1* | 2/2014 | Ganesh | H04M 1/72538 455/404.1 |
| 2014/0059444 A1* | 2/2014 | Yun | H04L 41/22 715/738 |
| 2014/0066018 A1* | 3/2014 | Zhu | H04W 4/008 455/411 |
| 2014/0213186 A1* | 7/2014 | Gage et al. | 455/41.2 |
| 2014/0351099 A1* | 11/2014 | Zhu | H04W 4/005 705/28 |
| 2015/0173115 A1* | 6/2015 | Van Phan | H04W 76/023 455/404.2 |

OTHER PUBLICATIONS

Yazidi et al. "A User-Centric Approach for Personalized Service Provisioning in Pervasive Environments," Wireless Personal Communications, 2011, 61, 543-566, E-Published on Aug. 23, 2011.

* cited by examiner

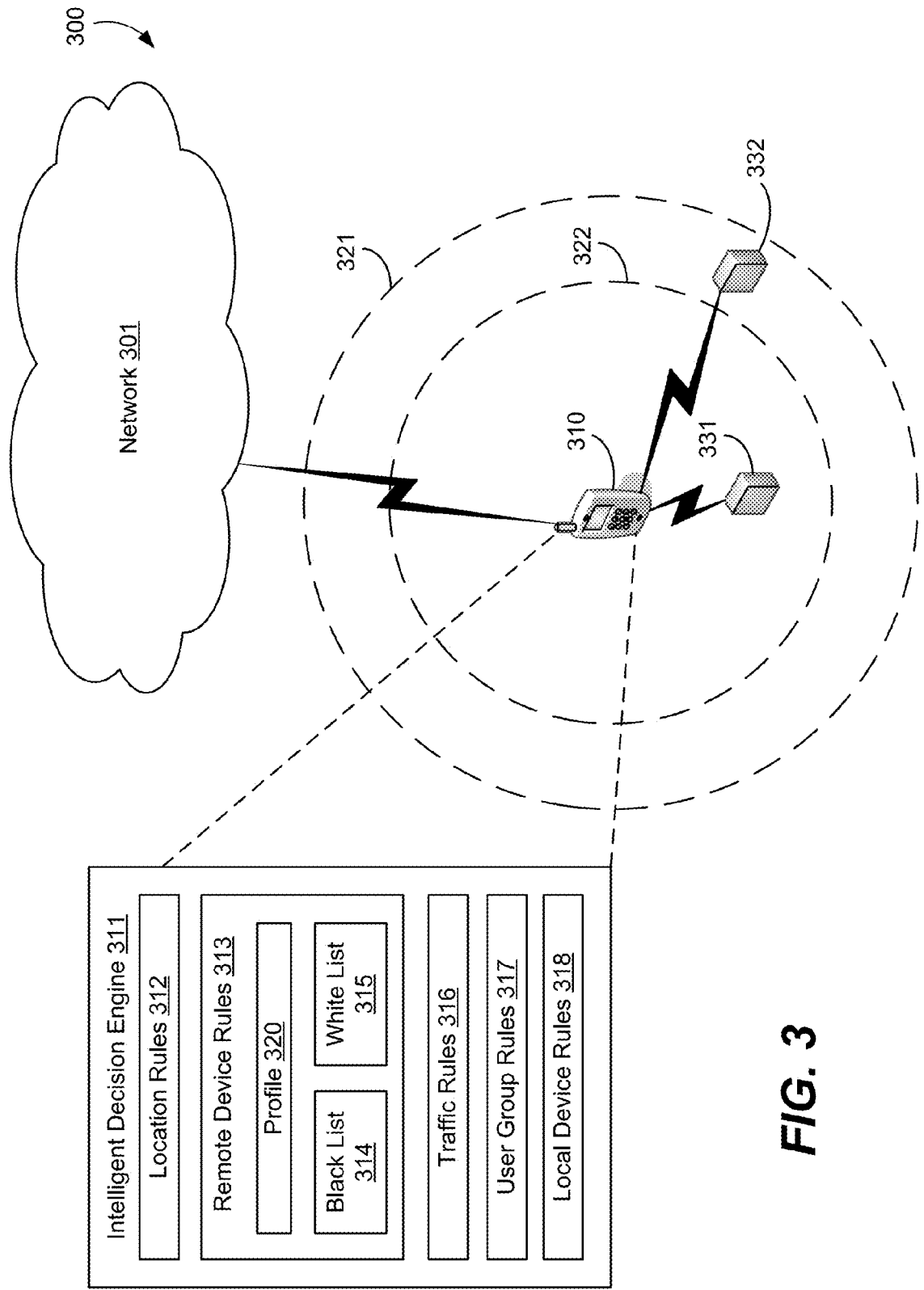

LONG TERM EVOLUTION MACHINE TO MACHINE PRIVACY PROTECTION

TECHNICAL FIELD

The technical field generally relates to wireless communications and more specifically relates to privacy protection in machine-to-machine devices operating in long term evolution (LTE) networks.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate over a network, such as the Internet. IoT may facilitate communication with even mundane everyday objects, such as products in a grocery store, and thereby reduce costs and waste by improving knowledge of such objects. For example, stores may maintain very precise inventory data by being able to communicate with, or obtain data from, objects that may be in inventory or may have been sold. Some M2M devices may also be configured to communicate using a wireless network, such as a long term evolution (LTE) network. For M2M devices and technologies to proliferate, steps must be taken to ensure the privacy of users and user data that may be transmitted, received, and stored by M2M devices.

SUMMARY

A method is disclosed for implementing LTE M2M privacy protection by detecting, at an intelligent decision engine configured on a mobile device, a machine-to-machine (M2M) communication from an M2M device and determining, at the intelligent decision engine configured on the mobile device, that the M2M communication meets a one or more criteria configured at the intelligent decision engine. If the criteria are met, in response the intelligent decision engine allows the mobile device to engage in M2M communications with the M2M device.

A wireless mobile device is also disclosed that may include a memory comprising executable instructions and a processor that effectuates operations that may include detecting a machine-to-machine (M2M) communication from an M2M device and determining that the M2M communication meets at least one criteria configured at an intelligent decision engine executing on the wireless mobile device. If the criteria are met, in response the mobile device may be allowed to engage in M2M communications with the M2M device.

A tangible computer-readable storage medium having computer-executable instructions is also disclosed, where the instructions cause a processor to effectuate operations that may include detecting, at an intelligent decision engine configured on a mobile device, a machine-to-machine (M2M) communication from an M2M device and determining, at the intelligent decision engine configured on the mobile device, that the M2M communication meets at least one criteria configured at the intelligent decision engine. The operations may further cause the processor to, in response to determining that the M2M communication meets the criteria, allow the mobile device to engage in M2M communications with the M2M device. These and other aspects of the present disclosure are set forth in more detail below and in the figures.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 3 illustrates a non-limiting exemplary system in which methods and systems for LTE M2M privacy protection may be implemented.

DETAILED DESCRIPTION OF ILLUSTRATIVE EMBODIMENTS

Figure 1A:
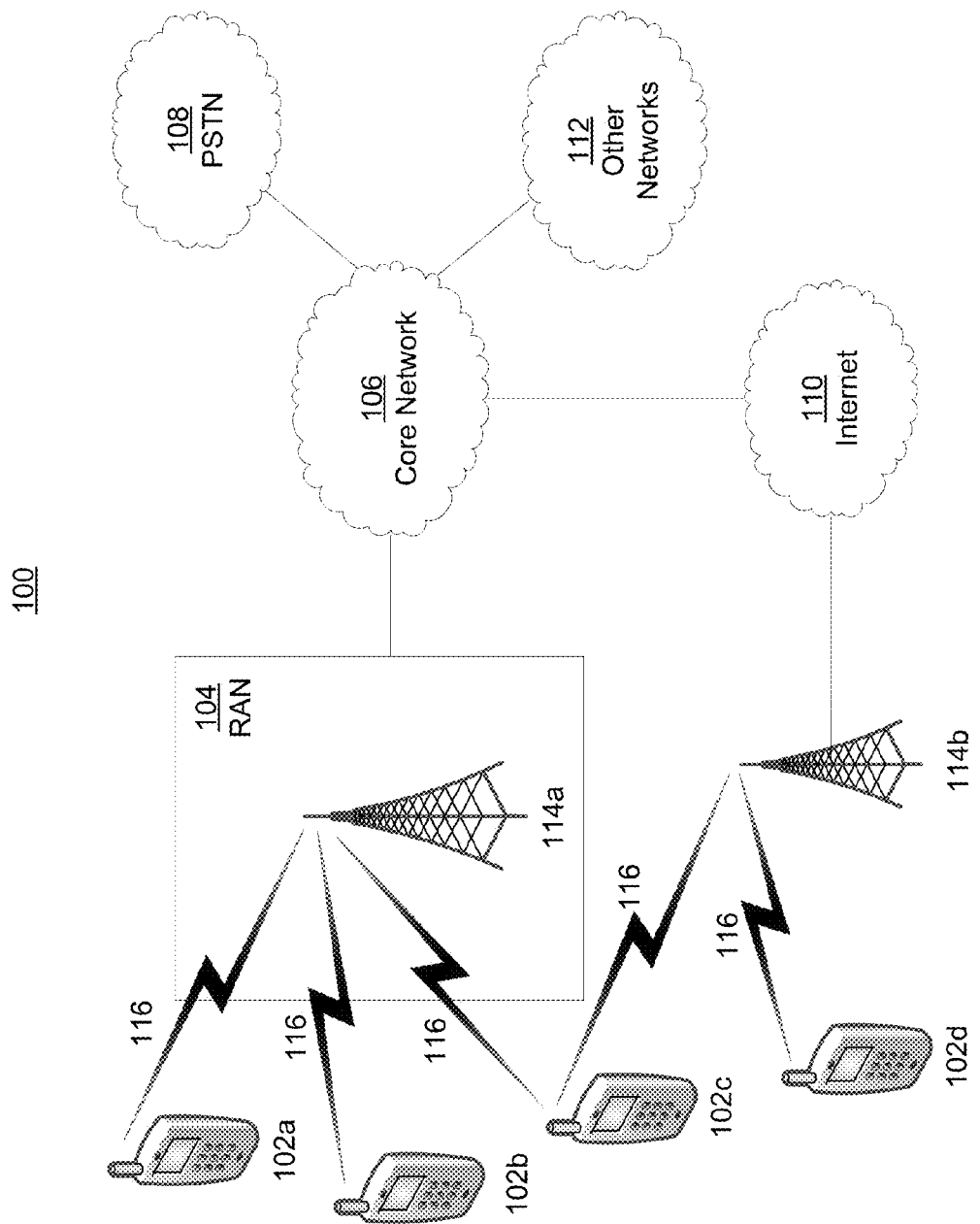
FIG. 1A is a system diagram of an example communications system in which methods and systems for LTE M2M privacy protection may be implemented.

FIG. 1A is a diagram of an example communications system 100 in which methods and systems for LTE M2M privacy protection as disclosed herein may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1A may also be referred to herein as a network.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
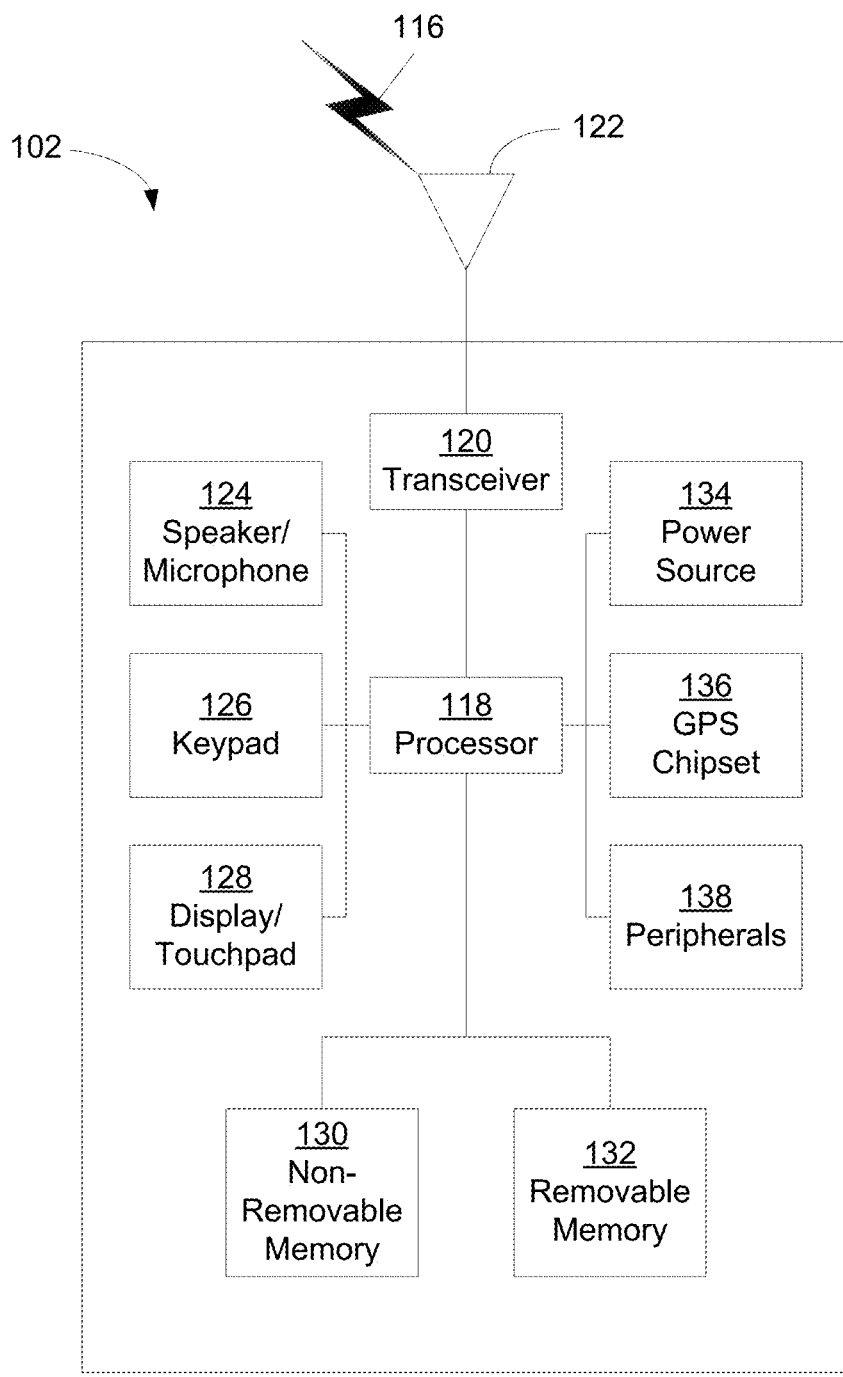
FIG. 1B is a system diagram of an example mobile device (also referred to as a wireless transmit/receive unit (WTRU) and/or as user equipment (UE)) that may be used within the communications system illustrated in FIG. 1A.

FIG. 1B is a system diagram of an example M2M device 102, which may be an LTE capable device such as a WTRU. Alternatively, device 102 may be an M2M terminal device or an M2M gateway device. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip. The processor 118 may perform application-layer programs (e.g., browsers) and/or radio access-layer (RAN) programs and/or communications. The processor 118 may perform security operations such as authentication, security key agreement, and/or cryptographic operations, such as at the access-layer and/or application layer for example.

The transmit/receive element 122 may be configured to transmit signals to, or receive signals from, a base station (e.g., the base station 114a) and/or an M2M service platform over the air interface 116. For example, in one embodiment, the transmit/receive element 122 may be an antenna configured to transmit and/or receive RF signals. The transmit/receive element 122 may support various networks and air interfaces, such as LTE, WLAN, WPAN, cellular, and the like. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
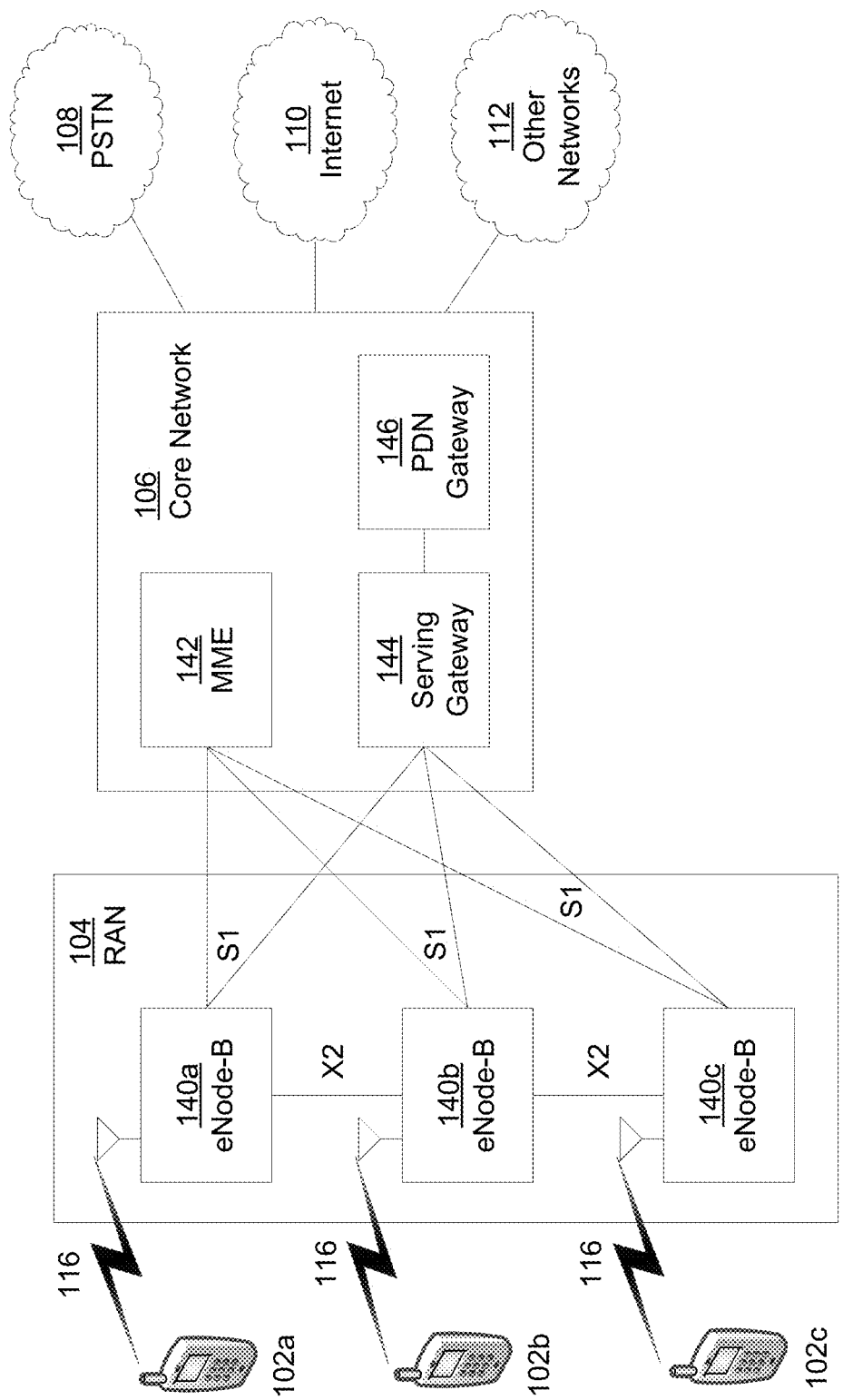
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2A:
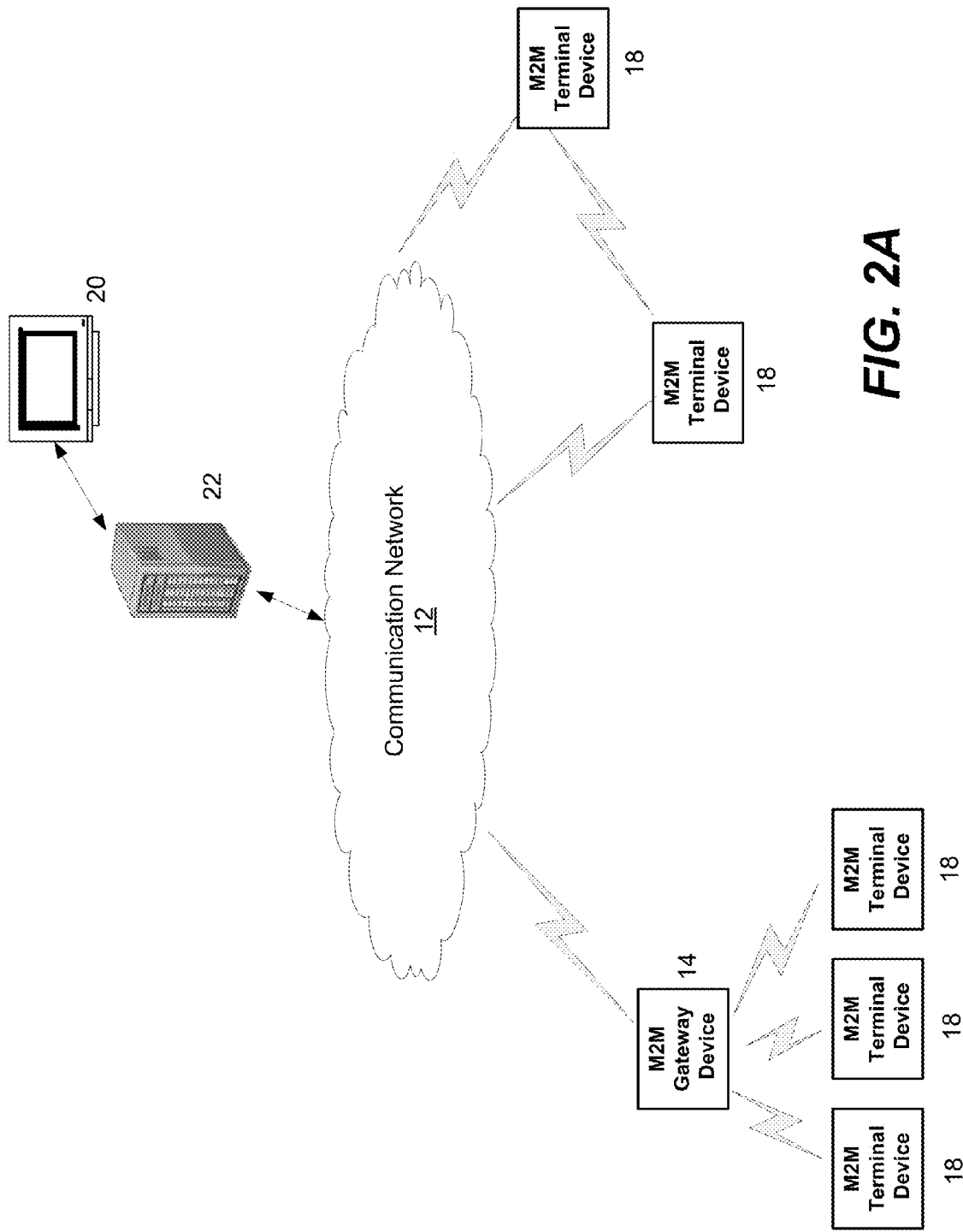
FIG. 2A is a system diagram of an example machine-to-machine (M2M) or Internet of Things (IoT) communication system in which one or more disclosed embodiments may be implemented.

FIG. 2A is a diagram of an example machine-to machine (M2M) or Internet of Things (IoT) communication system 10 in which one or more disclosed embodiments of LTE M2M privacy protection systems and methods may be implemented. Generally, M2M technologies provide building blocks for the IoT, and any M2M device, gateway or service platform may be a component of the IoT as well as an IoT service layer, etc.

As shown in FIG. 2A, the M2M/IoT communication system 10 includes a communication network 12. The communication network 12 may be a fixed network or a wireless network (e.g., LTE, WLAN, cellular, or the like) or a network of heterogeneous networks. For example, the communication network 12 may comprise of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 2A, the M2M/IoT communication system 10 may include an M2M gateway device 14 and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 may be configured to transmit and receive signals via the communication network 12 and/or direct radio link. The M2M gateway device 14 allows wireless M2M devices (e.g., cellular and non-cellular) as well as fixed network M2M devices (e.g., PLC) to communicate either through operator networks, such as the communication network 12, or through direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including LTE, other forms of cellular, WLAN, WPAN (e.g., Zigbee, 6LoWPAN, Bluetooth), direct radio link, and wireline for example.

The illustrated M2M service platform 22 provides services for the M2M application 20, M2M gateway devices 14, M2M terminal devices 18, and the communication network 12. It will be understood that the M2M service platform 22 may communicate with any number of M2M applications, M2M gateway devices 14, M2M terminal devices 18, and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 2B:
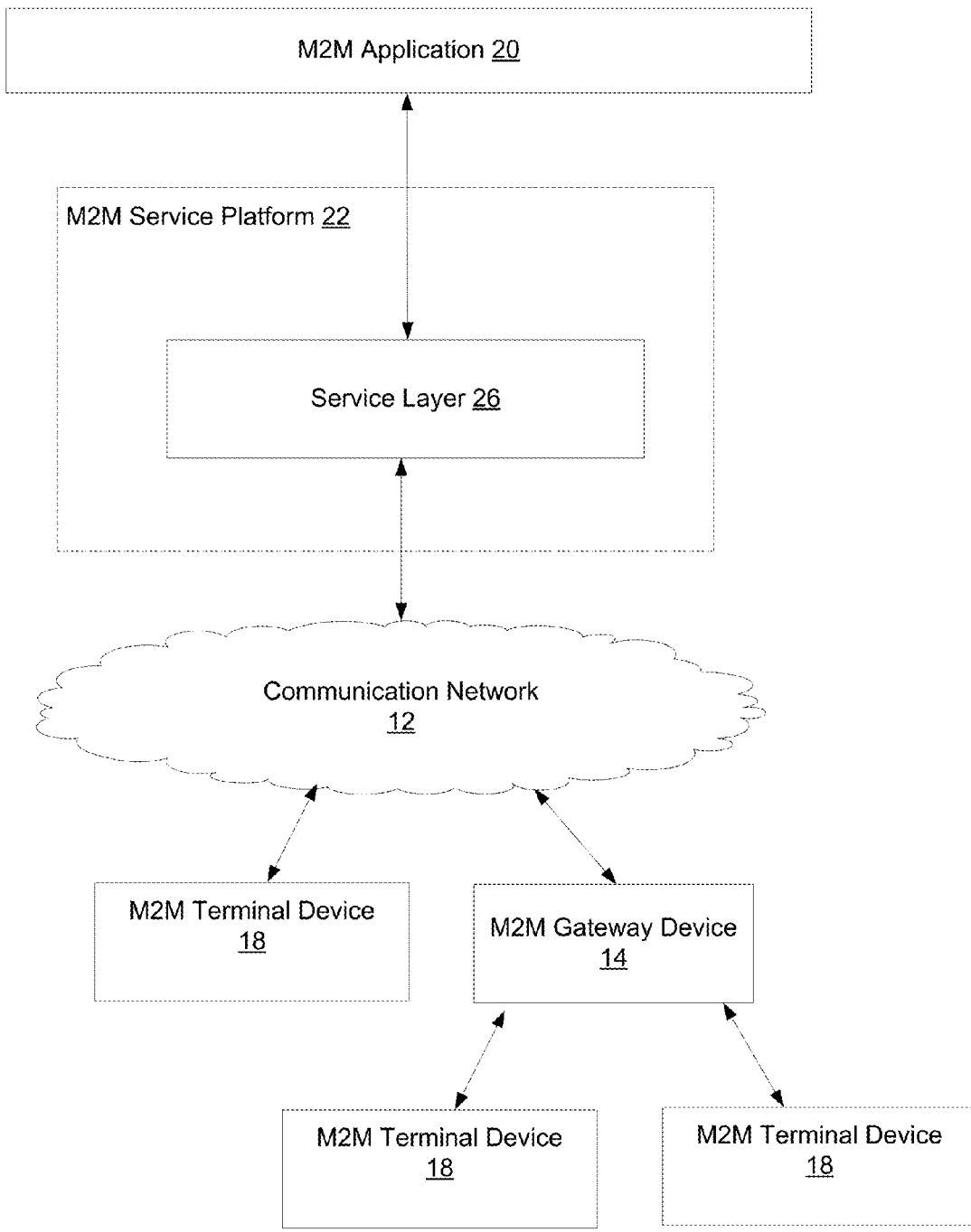
FIG. 2B is a system diagram of an example architecture that may be used within the M2M/IoT communications system illustrated in FIG. 2A.

Referring also to FIG. 2B, the M2M service platform typically implements a service layer 26 that provides a core set of service delivery capabilities that diverse applications and verticals can leverage. These service capabilities enable M2M applications 20 to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

In some embodiments, M2M applications 20 may include desired applications that form the basis for creation of one or more P2PNWs that include devices that use the disclosed service coverage management systems and methods. M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20. The applications with which the described service layer and objects interact may be applications such as those of M2M applications 20.

Figure 2C:
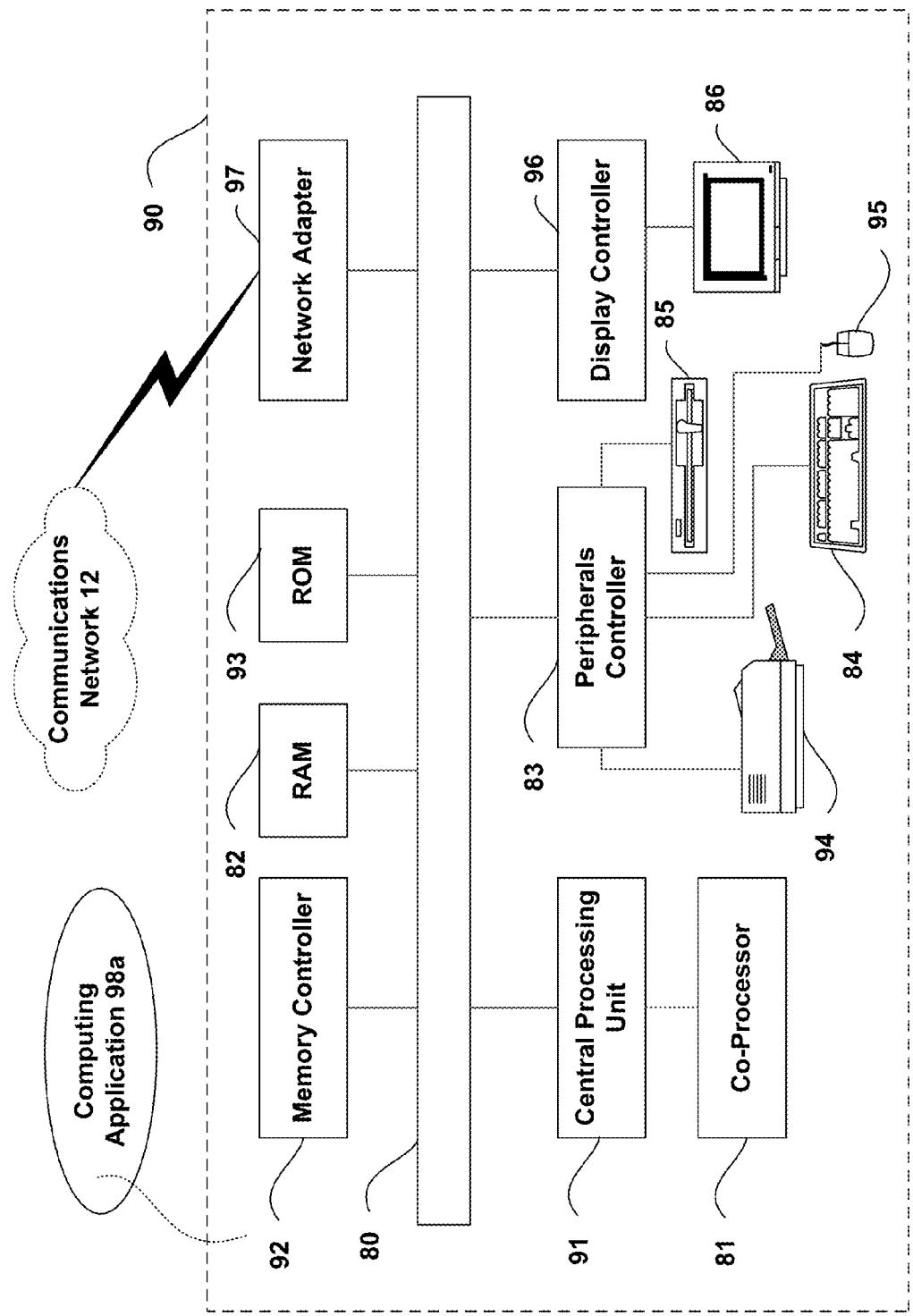
FIG. 2C is a block diagram of an example computing system in which aspects of the communication system of FIG. 2A may be embodied.

FIG. 2C is a block diagram of an exemplary computing system 90 on which, for example, the M2M service platform 22 of FIGS. 2A and 2B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the service coverage management systems and methods.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 2A and 2B. In an embodiment, network adaptor 97 may receive and transmit data related to the disclosed service coverage management systems and methods.

FIG. 3 illustrates non-limiting exemplary system 300 in which embodiments of the instant disclosure may be implemented. Mobile device 310 may be any type of mobile wireless device that is capable of communication with a wireless network as described herein. Mobile device 310 may communicate with wireless network 301, which may be any type of wireless network as described herein. Mobile device 310 may also be capable of M2M communication with M2M devices, such as M2M device 331 and M2M device 332, which may each be any type of M2M device as described herein.

Executing and/or configured on mobile device 210 may be intelligent decision engine 311, which may be implemented as software, hardware, or a combination thereof configured on mobile device 310. Intelligent decision engine 311 may be configured to apply rules and/or perform other actions to ensure the security and privacy of M2M communications and limit such communications as indicated by its configuration. Because the number and types of M2M devices continues to increase and is expected to do so for the foreseeable future, ensuring secure and private interactions with such devices will become increasingly more important. Intelligent decision engine 311 may function automatically, without requiring, though in most embodiments allowing, user interaction. Automatic functionality of intelligent decision engine 311 may be an important aspect of many embodiments because M2M interactions are often autonomous (i.e., do not require user interaction or involvement).

In an embodiment, intelligent decision engine 311 may be configured with remote device rules 313 that may include any configuration or rules that intelligent decision engine 311 may use to determine whether to initiate or accept M2M communications from another device. Any criteria may be used in this determination. For example, in an embodiment, intelligent decision engine 311 may maintain profile 320 of the user of mobile device 310 that may include identifying information, such as a user name. Intelligent decision engine 311 may be configured to allow M2M communications only with other M2M devices that are associated with the same user name as that provided in such a profile. All other M2M communications may be blocked. For example, where M2M device 332 is associated with some other user and M2M device 331 is associated with the user that has a user name in profile 320 (i.e., configured with the same user name), intelligent decision engine 311 may allow M2M communication between mobile device 310 and M2M device 331 while blocking communication between mobile device 310 and M2M device 332. Alternatively, other communications not permitted based on the remote device's user name may then be compared to other rules or configurations configured at intelligent decision engine 311 to determine if such communications should be permitted.

In another embodiment, intelligent decision engine 311 may use location rules 312 to determine whether to allow M2M communications between mobile device 310 and M2M devices. In one such embodiment, mobile device 310 may determine its location via communications with network 301 (e.g., requesting a location of mobile device 310 from a location server via network 301 or receiving a proactive communication from network 301 with a location of mobile device 310) or using internal GPS components to determine a location of mobile device 310. Intelligent decision engine 311 may use that location to determine whether the location matches any of location rules 312. Location rules 312 may list one or more locations or areas within which mobile device 310 is permitted to engage in M2M communications. Alternatively, or in addition, location rules 312 may list one or more locations or areas within which mobile device 310 is not permitted to engage in M2M communications. Locations and areas configured in location rules 312 may take any format, including coordinates to define a location or an area, coordinates of a point and a radius or diameter about that point to define an area, etc. In some embodiments, location data for mobile device 310 may be regularly or continuously updated, while in other embodiments, location data for mobile device 310 may be updated only as needed, for example, when an M2M device is detected. All such embodiments are contemplated as within the scope of the present disclosure.

In another embodiment, intelligent decision engine 311 may use location rules 312 to determine one or more zone within which M2M communications between mobile device 310 and M2M devices are to be allowed. In one such embodiment, mobile device 310 may determine its location via communications with network 301 (e.g., requesting a location of mobile device 310 from a location server via network 301 or receiving a proactive communication from network 301 with a location of mobile service 310) or using internal GPS components to determine a location of mobile device 310. Intelligent decision engine 311 may determine a zone about that location in which M2m communications are permitted. For example, intelligent decision engine 311 may be configured with a radius or diameter that allows it to determine that its current permitted M2M communications zone is zone 321. Note that zone size and type may be determined by the location of mobile device 310. For example, mobile device 310 may determine it is in public or otherwise not at a user's home, and therefore may use a smaller zone, such as zone 322, while when mobile device 310 determines that it is at home, to may use a larger zone such as zone 321. Zone size may also be affected by time of day (as described below), status of mobile device, such as in emergency mode (e.g., 911 call in progress, therefore make zone small or of zero size) or normal mode (other examples provided herein), or any other additional criteria.

After determining the appropriate zone, mobile device 310 and/or intelligent decision engine 311 may then determine a location of an M2M device that it may communicate with, for example, in response to a received communication or query from such a device. For example, intelligent decision engine 311 may receive a query from M2M device 331 for M2M communications and in response determine that M2M device 331 is currently within permitted communications zone 321. Intelligent decision engine 311 may similarly determine that M2M device 331 is also within permitted communications zone 321. In response, intelligent decision engine 311 may permit M2M communications between mobile device 310 and M2M devices 331 and 332. In some embodiments, location data for mobile device 310 may be regularly or continuously updated and therefore zone data may be regularly or continuously updated. In other embodiments, location data for mobile device 310 may be updated only as needed, for example, when an M2M device is detected, and therefore zone data may be updated only as needed. All such embodiments are contemplated as within the scope of the present disclosure.

In another embodiment, intelligent decision engine 311 may use traffic rules 316 to determine whether to allow M2M communications between mobile device 310 and M2M devices. In one such embodiment, mobile device 310 may determine a traffic load on its communication connection with network 301 and determine whether to allow M2M communications based on whether the load meets any of the rules, thresholds, or other criteria listed in traffic rules 316. For example, intelligent decision engine 311 may determine that the traffic load on a communications link between mobile device 310 and network 301 exceeds a threshold and, because M2M communications may also result in network communications, limit or prevent M2M communications by mobile device 310. Alternatively, selected M2M devices or M2M device types, such as those that are likely to generate traffic between mobile device 310 and network 301, may be configured in traffic rules 316 and when traffic with network 301 surpasses a threshold, communications with such devices may not be permitted while communications with other M2M devices may be permitted. In some embodiments, traffic load data for mobile device 310 may be regularly or continuously updated, while in other embodiments, traffic load data for mobile device 310 may be updated only as needed, for example, when an M2M device is detected. All such embodiments are contemplated as within the scope of the present disclosure.

Note again that combinations of criteria may be used by intelligent decision engine 311. For example, intelligent decision engine 311 may initially determine that M2M devices 331 and 332 and both within permitted M2M communications zone 321 and may allow M2M communications between these devices and mobile device 310. However, intelligent decision engine 311 may later determine that traffic between mobile device 310 and network 301 has exceeded a threshold defined in traffic rules 316. Upon such a determination, location rules 312 may indicate that a communications zone is to be reduced if traffic exceeds such a threshold. In response to this determination, intelligent decision engine 311 may reduce the zone of permitted M2M communications to zone 322, which may have a smaller area than zone 321. Zone 322 may not cover M2m device 332, and therefore M2M communications between that device and mobile device 310 may be discontinued, in some embodiments immediately and in other embodiments gracefully by properly terminating and shutting down such communications as soon as possible. M2M device 331 may be within new permitted M2M communications zone 322 and therefore communications may be allowed to continue between that device and mobile device 310. Any other combinations of traffic rules, location rules, and other criteria may be used and all such embodiments are contemplated as within the scope of the present disclosure.

In some embodiments, intelligent decision engine 311 may include remote device rules 313 that is configured with M2M device-specific access lists, such as "black list" 314 and "white list" 315. Black list 314 may be a list of specific M2M devices that are not permitted to communicate with mobile device 310 using M2M communications, while white list 315 may be a list of specific M2M devices that are permitted to communicate with mobile device 310 using M2M communications. In some embodiments, intelligent decision engine 311 may have both lists, while in other intelligent decision engine 311 may have only one or the other. Intelligent decision engine 311 may receive a query from M2M device 331 for M2M communications and in response determine that M2M device 331 is currently not listed on black list 314 and/or is listed on white list 315 and permit M2M communications between mobile device 310 and M2M device 331. Similarly, intelligent decision engine 311 may receive a query from M2M device 332 for M2M communications and in response determine that M2M device 332 is currently listed on black list 314 and/or is not listed on white list 315 and block M2M communications between mobile device 310 and M2M device 332. Here again, these criteria may be combined with any other criteria described herein, including any combinations of traffic rules, location rules, and other criteria, and all such embodiments are contemplated as within the scope of the present disclosure. Note that white lists and black lists may be set up by a user directly using mobile device 310, set up by a user using an interface to a device that may be accessed via network 301 and then retrieved by mobile device 310 for use by intelligent decision engine 311, or such lists may be set up by others, such as a service provider, either directly on mobile device 310 or via network 301.

In some embodiments, intelligent decision engine 311 may include user group rules 317 that are configured with M2M user groups that are permitted or prevented from engaging in M2M communications with mobile device 310. For example, user group rules 317 may include a list of specific user groups to which mobile device 310 belongs, and thus with which mobile device 310 may communicate using M2M communications. Alternatively, user group rules 317 may include a list of specific user groups to which mobile device 310 does not belong, and thus with which mobile device 310 may not communicate using M2M communications. Such user groups may simply be groups of devices owned by or otherwise associated with the same user that owns or is associated with the user of mobile device 310. Alternatively, any other criteria that may be used to group devices may be used to generate the user groups of user group rules 317. For example, a user may have defined a "work" user group and a "home" user group, each defining devices that are associated with the user's workplace or home, respectively. Note that user groups may be set up by a user directly using mobile device 310, set up by a user using an interface to a device that may be accessed via network 301 and then retrieved by mobile device 310 for use by intelligent decision engine 311, or such groups may be set up by others, such as a service provider, either directly on mobile device 310 or via network 301.

In some embodiments, intelligent decision engine 311 may include local device rules 318 that are configured with rules based on characteristics or data associated with mobile device 310. For example, the time of day may be used and windows of time may be provided in local device rules 318 that set forth M2M communications restrictions. In an embodiment, local device rules 318 may define a time window of business hours during which M2M communications are permitted and a time window of after business hours within which M2M communications are not permitted. Thus, if either of M2M devices 331 or 332 attempts M2M communications with mobile device 310 within the time window of business hours, such communications will be permitted, while if either of M2M devices 331 or 332 attempts M2M communications with mobile device 310 outside of the time window of business hours, or within the time window of after business hours, such communications will not be permitted. Other criteria that may be used and that may be configured in local device rules 318 include calendar activity, device characteristics (e.g., processor usage, temperature, memory load, etc.) presence, type, and/or priority of email, text messages, voicemails, etc.

Note again that combinations of criteria may be used by intelligent decision engine 311. For example, intelligent decision engine 311 may initially determine that M2M device 331 is within a user group listed in user group rules 317 and may allow M2M communications between this device and mobile device 310 only within a time period defined in local device rules 318. Such a time period may be configured with the user group in user group rules 317 or a user group may be defined with a time period in local device rules 318. Alternatively, each set of rules and/or criteria considered by intelligent decision engine 311 may have a priority, and may be checked in order. For example, user group rules 317 may be checked before time period rules in local device rules 318. Therefore, even though an M2M communication from a device listed in a user group defined in user group rules 317 may permitted under those rules, it may still be blocked by a higher priority time period rule defined in local device rules 318. Such priorities or orders of consideration may be user-defined or provider-defined. Any order and type of priorities are contemplated as within the scope of the present disclosure.

Local device rules 318 may also indicate which M2M communications are to be manually approved by a user of mobile device 310. For example, certain M2M device types may be configured in local device rules 318, and in response to an M2M communication with such a device, intelligent decision engine 311 may present an interface to a user of mobile device 310 to allow the user to approve or decline such communications. Any other criteria may be used to determine that manual approval needs to be obtained before M2M communications may commence, and all such criteria are contemplated as within the scope of the present disclosure.

Local device rules 318 may also indicate which M2M communications are to be approved only through the receipt of particular data from the requesting M2M device. For example, local device rules may define a code (e.g., a username and password) that may be required before an M2M device may communicate with mobile device 310. Such a code may be requested from, or may be automatically provided by, for example, M2M device 331 or 332. Upon confirmation that the code matched a code listed in local device rules 318, such communications may be allowed to proceed.

Note that M2M devices may broadcast or unicast privacy protection status and other information to other M2M devices. For example, where mobile device 310 is currently not communicating with any other M2M devices for any reason, it may broadcast, once or periodically, a notice to M2M devices 331 and 332 that it is currently unavailable for M2M communications. Alternatively, where mobile device 310 is currently not communicating with a particular M2M device, such as M2M device 332, for any reason, it may transmit, once or periodically, a notice to M2M device 332 that it is currently unavailable for M2M communications with that device. Such transmissions may be limited in distance or scope by adjustment of signal strength by mobile device 310.

Figure 4:
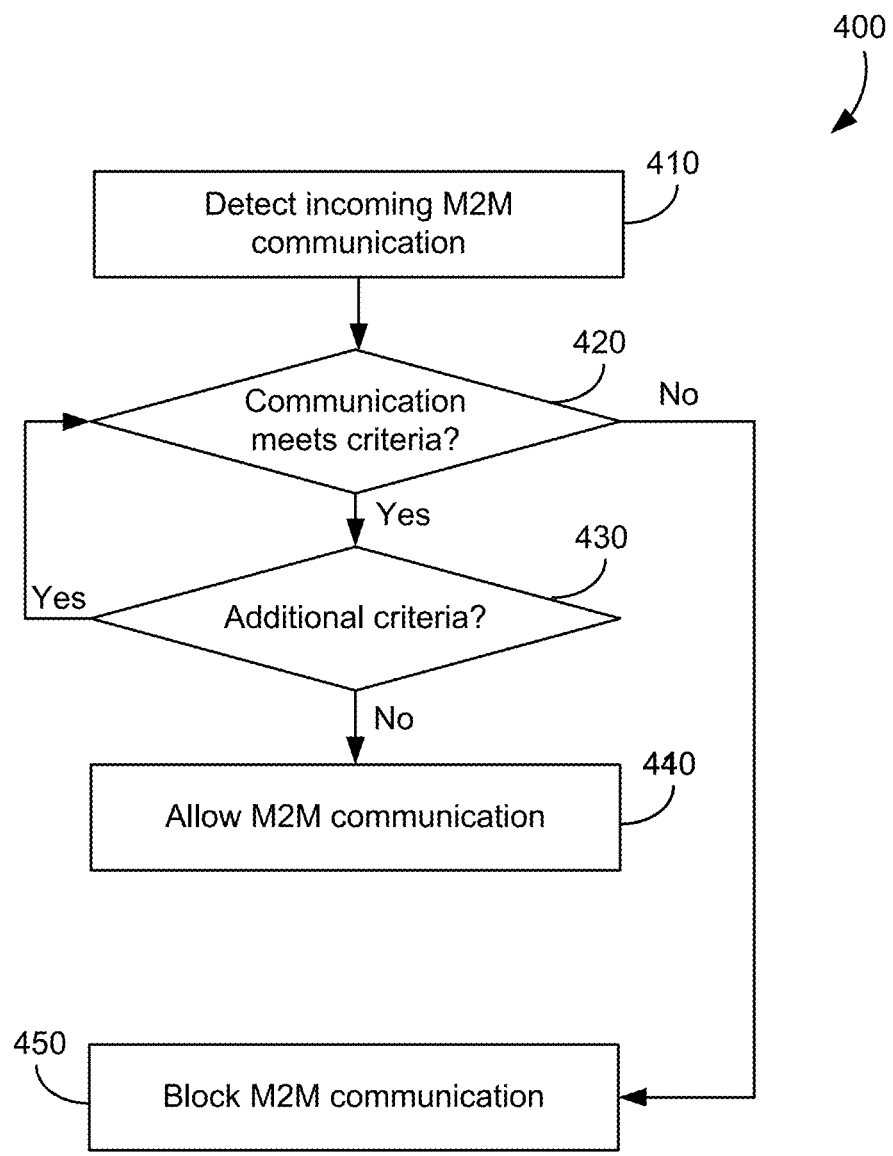
FIG. 4 illustrates a non-limiting exemplary method of implementing LTE M2M privacy protection.

FIG. 4 illustrates exemplary non-limiting method 400 of implementing an embodiment as disclosed herein. Method 400, and the individual actions and functions described in regard to method 400 and the blocks of method 400, may be performed by any one or more devices, including those described herein. In an embodiment, method 400 may be performed by a hardware or software component of a device such as mobile device 310, or a component that is a combination thereof, by any other mobile device, and/or by software configured and/or executing on any type of mobile device. Note that any of the functions and/or actions described in regard to any of the blocks of method 400 may be performed in any order, in isolation, with a subset of other functions and/or actions described in regard to any of the other blocks of method 400 or any other method described herein, and in combination with other functions and/or actions, including those described herein and those not set forth herein. All such embodiments are contemplated as within the scope of the present disclosure.

At block 410, an incoming M2M communication from an M2M device may be detected. Such detection may occur at a mobile device as described herein, and then provided to an intelligent decision engine as described herein. At block 420, a determination may be made as to whether the communication meets a criteria configured at the mobile device, such as any of the criteria provided by any of the rules components of intelligent decision engine 311 as set forth above. This determination may be made at an intelligent decision engine such as intelligent decision engine 311. The initial criteria evaluated may be determined by user configuration, a default configuration, a provider configuration or via any other means. If the communication does not meet the initially determined criteria, then at block 450, the communication may be blocked.

If the communication does meet the initial criteria, at block 430 a determination may be made as to whether any other criteria are to be evaluated before allowing the M2M communication. If not, at block 440 the M2M communication may be allowed. However, if additional criteria are to be evaluated before allowing the M2M communication, method 400 may return to block 420 for additional criteria evaluation. If those criteria are satisfied, than block 430 may be evaluated again to determine whether additional criteria must be satisfied to allow the communication. Method 400 may repeat blocks 420 and 430 until it is determined that the M2M communication cannot be allowed, in which case the method moves to block 450 where the M2M communication is blocked, or until it is determined that the M2M communication satisfies all applicable criteria, in which case the method may move to block 440 where the M2M communication is permitted to proceed.

While example embodiments of methods and systems for LTE M2M privacy protection have been described in connection with various computing devices/processors, the underlying concepts may be applied to any computing device, processor, or system capable of implementing LTE M2M privacy protection. The various techniques described herein may be implemented in connection with hardware or software or, where appropriate, with a combination of both. Thus, the methods and systems for LTE M2M privacy protection may be implemented by, or certain aspects or portions thereof may take the form of, program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is neither a transient nor a propagating signal per se. When the program code is loaded into and executed by a machine, such as a computer, the machine becomes an apparatus for implementing LTE M2M privacy protection. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

While methods and systems for LTE M2M privacy protection have been described in connection with the various embodiments of the various figures, it is to be understood that other similar embodiments may be used or modifications and additions may be made to the described embodiments for performing the same function of LTE M2M privacy protection without deviating therefrom. For example, one skilled in the art will recognize that LTE M2M privacy protection as described in the present application may apply to any environment, whether wired or wireless, and may be applied to any number of such devices connected via a communications network and interacting across the network. Therefore, systems and methods for LTE M2M privacy protection should not be limited to any single embodiment, but rather should be construed in breadth and scope in accordance with the appended claims.

What is claimed is:

1. A method comprising:

detecting, at a mobile device, at a time of day a first communication from a first device having a device type, the first communication transmitted via a long term evolution (LTE) network;

identifying a geographic location associated with the mobile device;

determining that the geographic location is not within a geographic area in which, at the time of day, the mobile device is prohibited from engaging in communications with devices of the device type;

determining device characteristics based on the geographic location and the time of day;

determining a traffic load on a communication link between the mobile device and the LTE network;

determining that the first communication meets a first criteria and a second criteria, wherein the first criteria is based on whether the device characteristics include a characteristic of the first device, and wherein the second criteria is based on the traffic load; and responsive to determining that the first communication meets the first criteria and the second criteria and based on the geographic location not being within the geographic area, allowing the mobile device to engage in the communications with the first device, wherein the device characteristics include at least one of processor usage, memory load, or temperature.

2. The method of claim 1, further comprising:

determining whether a third criteria is met; and wherein allowing the mobile device to engage in the communications with the first device is further based on determining that the third criteria is met, wherein the third criteria comprises an emergency status of the mobile device.

3. The method of claim 1, wherein the first criteria and second criteria are determined in an order based on a first priority assigned to the first criteria and a second priority assigned to the second criteria.

4. The method of claim 3, wherein the first priority and the second priority are assigned by the mobile device.

5. The method of claim 1, further comprising:
if the first criteria is not met, querying a user for manual approval of the first communication; and
modifying the device characteristics list based on the manual approval.

6. The method of claim 1, further comprising:
determining whether a third criteria is met,
wherein allowing the mobile device to engage in the communications with the first device is further based on determining that the third criteria is met, wherein the third criteria comprises determining receipt of a username and password.

7. The method of claim 1, further comprising:
determining whether a third criteria is met,
wherein allowing the mobile device to engage in the communications with the first device is further based on determining that the third criteria is met, wherein the third criteria comprises the first communication aligning with a calendar activity.

8. The method of claim 1, wherein the first criteria is met based on the device characteristics not including the characteristic of the first device.

9. The method of claim 1,
wherein the characteristic is the device type.

10. The method of claim 9, further comprising:
identifying a black list;
wherein allowing the mobile device to engage in the communications with the first device is further based on determining that a third criteria is met, wherein the third criteria is met if the black list does not include an identifier of the first device.

11. A mobile device comprising:
a processor; and
a memory comprising executable instructions that cause the processor to effectuate operations comprising:
detecting, at a time of day, a first communication from a first device having a device type, the first communication transmitted via a long term evolution (LTE) network;
identifying a geographic location associated with the mobile device;
determining that the geographic location is not located within a geographic area in which, at the time of day, the mobile device is prohibited from engaging in communications with devices of the device type;
determining device characteristics based on the geographic location and the time of day;
determining a traffic load on a communication link between the mobile device and the LTE network:
determining that the first communication meets a first criteria and a second criteria, wherein the first criteria is based on whether the device characteristics include a characteristic of the first device, and wherein the second criteria is based on the traffic load; and
responsive to determining that the first communication meets the first criteria and the second criteria and based on the geographic location not being within the geographic area, allowing the mobile device to engage in the communications with the first device,
wherein the device characteristics include at least one of processor usage, memory load, or temperature.

12. The mobile device of claim 11, wherein the geographic location is a residence of a user associated with the mobile device, and the device characteristics include being installed in the residence.

13. The mobile device of claim 11, wherein the characteristic comprises the device type.

14. The mobile device of claim 11, wherein the operations further include:
identifying a black list,
wherein allowing the mobile device to engage in the communications with the first device is further based on determining that a third criteria is met, wherein the third criteria is met if the black list does not include the first device.

15. A tangible computer-readable storage medium comprising computer-executable instructions that cause a processor associated with a mobile device to effectuate operations, the operations comprising:
detecting, at a time of day, a first communication from a first device having a device type, the first communication transmitted via a long term evolution (LTE) network;
identifying a geographic location associated with the mobile device;
determining that the geographic location is not located within a geographic area in which, at the time of day, the mobile device is prohibited from engaging in communications with devices of the device type;
determining device characteristics based on the geographic location and the time of day;
determining a traffic load on a communication link between the mobile device and the LTE network;
determining that the first communication meets a first criteria and a second criteria, wherein the first criteria is based on whether the device characteristics a characteristic of the first device, and wherein the second criteria is based on the traffic load; and
responsive to determining that the first communication meets the first criteria and the second criteria and based on the geographic location not being within the geographic area, allowing the mobile device to engage in the communications with the first device,
wherein the device characteristics include at least one of processor usage, memory load, or temperature.

* * * * *